(12) United States Patent
Anderson et al.

(10) Patent No.: US 6,447,068 B1
(45) Date of Patent: Sep. 10, 2002

(54) POP-UP HEADREST FOR A VEHICLE

(75) Inventors: Rick A. Anderson, Grand Haven; Roy A. Von Alman, Holland, both of MI (US)

(73) Assignee: Johnson Controls Technology Company, Plymouth, MI (US)

(*) Notice: Subject to any disclaimer, the term of this patent is extended or adjusted under 35 U.S.C. 154(b) by 0 days.

(21) Appl. No.: 09/485,986

(22) PCT Filed: Aug. 27, 1998

(86) PCT No.: PCT/US98/18036

§ 371 (c)(1),
(2), (4) Date: May 9, 2000

(87) PCT Pub. No.: WO99/09862

PCT Pub. Date: Mar. 4, 1999

Related U.S. Application Data

(60) Provisional application No. 60/057,365, filed on Aug. 29, 1997.

(51) Int. Cl.[7] .................................................. A47C 1/10
(52) U.S. Cl. ........................................ 297/408; 297/391
(58) Field of Search ................................ 297/391, 403, 297/404, 408

(56) References Cited

U.S. PATENT DOCUMENTS

| | | | | |
|---|---|---|---|---|
| 2,652,101 A | * | 9/1953 | Samsky et al. | |
| 3,186,763 A | * | 6/1965 | Ferrara | |
| 4,711,494 A | * | 12/1987 | Duvenkamp | |

FOREIGN PATENT DOCUMENTS

| | | | |
|---|---|---|---|
| FR | 2672550 | * | 8/1992 |
| GB | 2132479 | * | 7/1984 |

* cited by examiner

Primary Examiner—Milton Nelson, Jr
(74) Attorney, Agent, or Firm—Foley & Lardner

(57) ABSTRACT

A pop-up headrest (12) for a vehicle seat assembly (10) which is movable between a retracted stowed position below the upper end of the seat assembly backrest (11) and a raised use position extending above the upper end of the backrest. The headrest is mounted to the vehicle body rearward of the backrest for rotation about a transverse axis. An over-center mechanism having a gas cylinder (20) is used to hold the headrest in both the raised use position and the retracted stowed position.

13 Claims, 5 Drawing Sheets

POP-UP HEADREST FOR A VEHICLE

CROSS REFERENCE TO A RELATED APPLICATION

This application claims priority from provisional application 60/057,365, filed Aug. 29, 1997.

BACKGROUND OF THE INVENTION

The present invention generally relates to a headrest in a vehicle and, more particularly, to a stowable headrest that can be transferred between an in-use position extending above the backrest body of a seat and a stowage position behind the seat.

There exists a number of adjustable vehicular headrests mounted to passenger seats for use in vehicles for providing passenger head restraint. The well known conventional headrests include a padded headrest body covered with a flexible upholstery material and extend above the back support region of a seat with the headrest typically attached directly to the seat. Some headrests are equipped with sliding connector rods that allow the headrest to be adjusted and removed from the seat as a separate unit. However, vehicles usually do not provide a convenient storage compartment for the removed headrest. In addition, there is a need to provide headrests for all passengers of the vehicle, including providing a headrest for the middle section of a three-passenger seat in the rear of the passenger compartment. However, the presence of an elevated headrest above the middle section of the back seat can block the driver's view behind the vehicle as seen by way of the rearview mirror.

Although there exists a variety of adjustable headrests, there remains a need for providing a headrest which can be conveniently made available to a passenger in the back seat of a vehicle when in use and readily adjustable to a stowed position that does not interfere with the driver's rearview line of sight.

SUMMARY OF THE INVENTION

Accordingly, it is therefore an aspect of the present invention to provide for a stowable headrest that may be easily moved to an upright position when in use, and to a stowed position, out of line of sight of the driver's rear view. It is a further aspect of the present invention to provide for such a headrest which may be easily held in both the raised, use position and the lowered, stowed position.

To achieve these and other aspects and advantages, the pop-up headrest of the present invention includes a headrest body having an internal support frame, and generally provided with a padded front face and covered with flexible upholstery material. The headrest body is disposed within a tray generally located behind the seat and is pivotally connected to the rear ledge of the vehicle such that the headrest body pivots about the rear ledge to raise and lower the headrest. A pivoting strut, preferably having a pneumatic cylinder and forcibly actuated rod, is pivotally supported between a pair of flanges and has an outer-extending rod connected to the headrest body. The strut with pneumatic cylinder pivots to swing to an over-center position to hold the headrest in a stowed position when retracted and a raised use position when deployed. The over-center positioning of the strut forcibly urges the end of the rod away from the strut cylinder body. When the headrest is raised to a use position, the strut pivots and its rod forcibly extends to lift and hold the headrest in an operable use position. When the headrest is manually returned to its retracted, stowed position, the strut pivots to its over-center position and holds the headrest in its retracted, stowed position.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
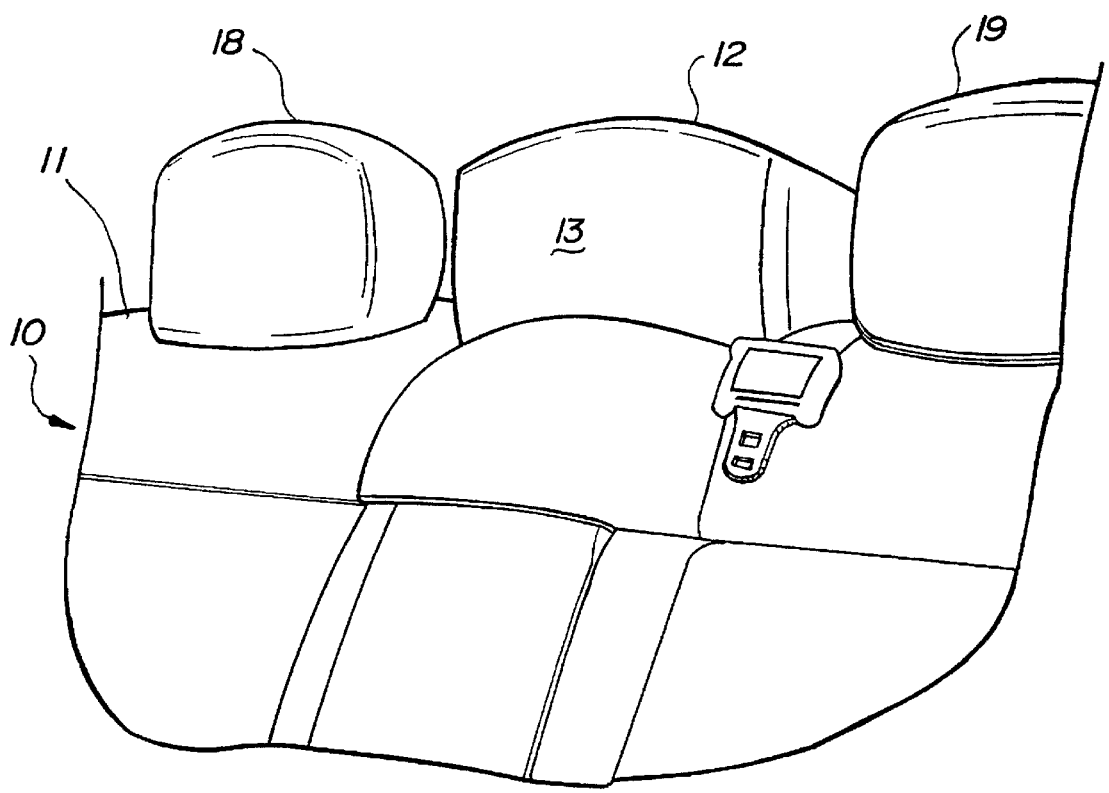
FIG. 1 is a perspective view of the rear seat of a vehicle showing a pop-up headrest of the present invention in a raised, deployed position.

Turning now to FIG. 1, the rear seat 10 of a passenger vehicle is shown generally having an inclined backrest 11 with suitable padding covered with flexible upholstery material, and is designed to seat three passengers. A pair of headrests 18 and 19 of the conventional type are shown fixedly attached to the upper side of the seat backrest for providing rearward head restraint for passengers seated on the outboard sections of seat 10. A pop-up headrest 12 is shown in a raised, deployed position above the middle section of the backrest of seat 10, according to the present invention. When deployed, pop-up headrest 12 has a padded front face 13 designed for engagement with the backside of the head of a passenger seated in the middle section of the seat 10 to provide rearward head restraint for protection and comfort. The pop-up headrest 12 of the present invention is manually deployable and may be easily raised to its deployed, use position, as shown in FIG. 1, and retracted to a lowered position for storage.

Figure 2:
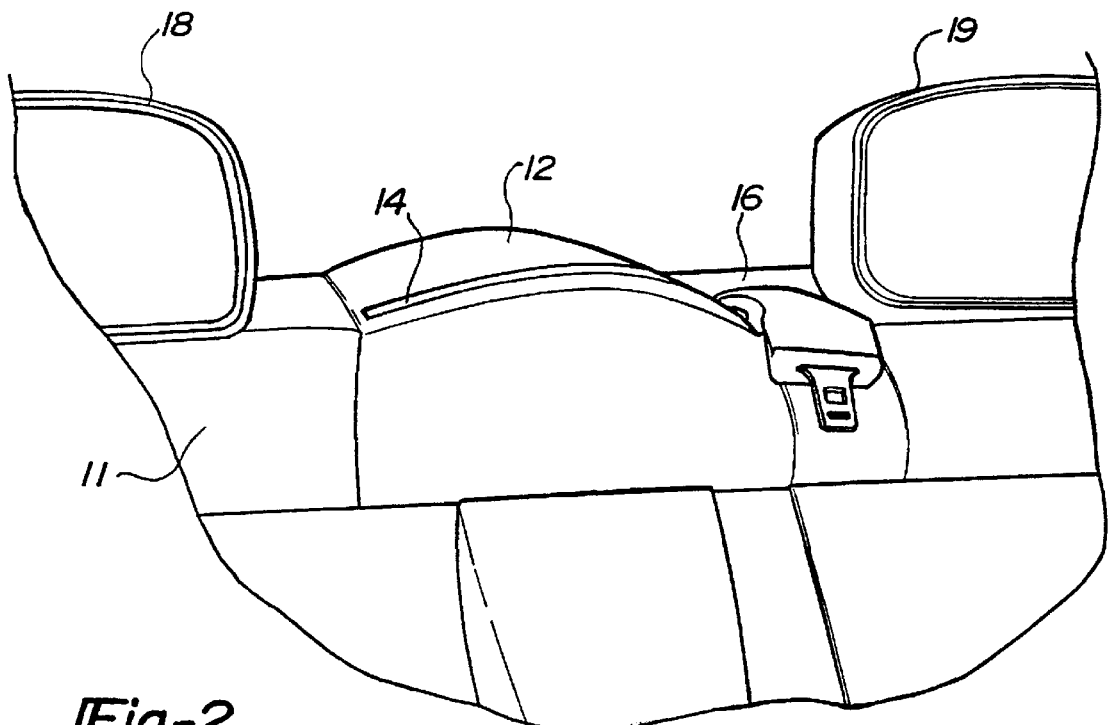
FIG. 2 is a perspective view of the rear seat of a vehicle illustrating the pop-up headrest in a lowered, retracted position.
Figure 3:
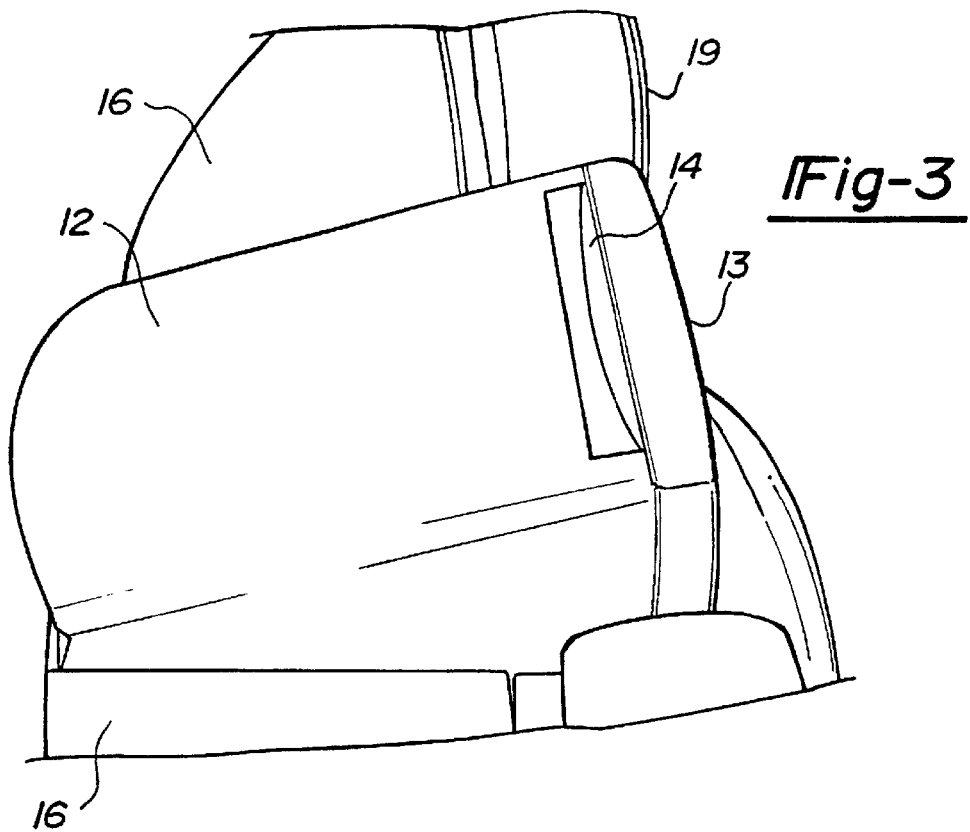
FIG. 3 is an elevated side view of the pop-up headrest in the raised, deployed position of FIG. 1.
Figure 4:
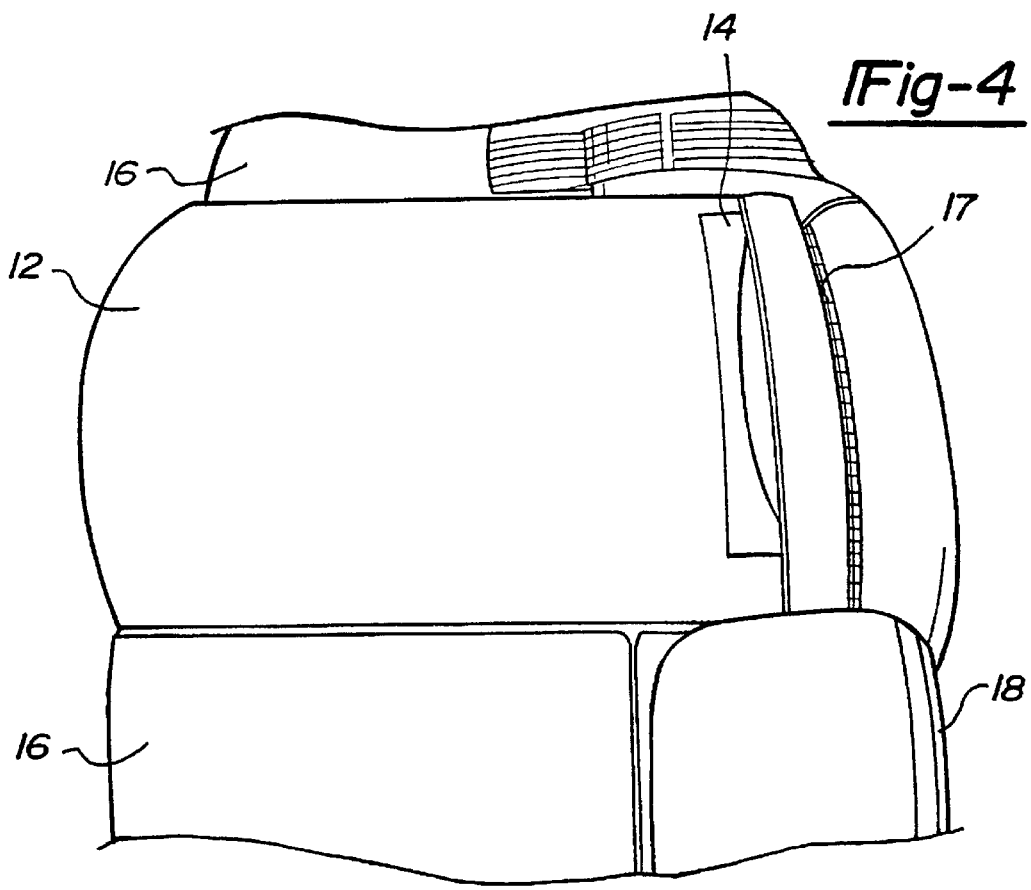
FIG. 4 is an elevated side view of the pop-up headrest in the lowered, retracted position of FIG. 2.

The pop-up headrest 12 is shown, in FIG. 2, fully retracted to its lowered, stowed position. The headrest 12 conveniently stows within a package tray 16 located behind the backrest of the seat 10 such that the headrest 12 is substantially flush with the top surface and upper end of the backrest 11 of the seat 10. With the pop-up headrest 12 fully retracted in its stowed position, the headrest 12 does not interfere the driver's rear view, particularly when looking through the back window of the vehicle with the use of an interior, center-mounted rearview mirror.

Referring to FIGS. 1–4, the pop-up headrest 12 is further shown having a raised front padded face 13 and slopes down in elevation toward the rear. The headrest 12 includes a recess 14 provided in the top surface, which serves as a handle for allowing a passenger to grab hold of and manipulate the headrest 12 up and down between its deployed and retracted positions, respectively. The headrest 12 extends into a hollow provided within a package tray 16. The package tray 16 is generally located behind the backrest 11 of the seat 10 near the rear window opening of the vehicle body in a region generally up front and above the vehicle trunk. The package tray 16 is a part of the body of the vehicle. The headrest 12 is further shown extending into a hollow 17 partially formed in the back side of the backrest of seat 10 such that a substantial portion of the headrest 12 is disposed behind seat 10, while a lesser portion of the headrest 12 is seated within the backrest 11 of seat 10.

Figure 5:
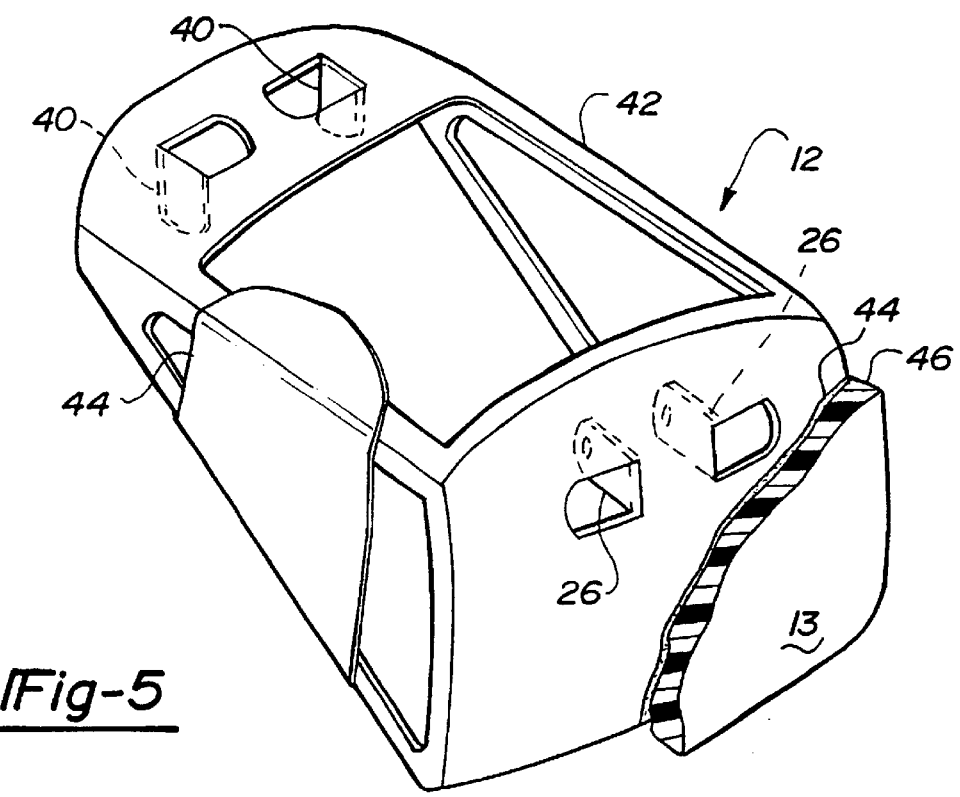
FIG. 5 is a fragmentary perspective view of the frame of the headrest body.

The headrest 12 frame and body is illustrated in FIG. 5. The headrest 12 generally includes an internal frame 42 defining the structure of the headrest 12 and is covered with a polymeric substrate 44 which may be screwed onto the frame 42. The internal frame 42 may include metal tubes or stamped sheet metal configured in a generally trapezoidal or rectangular shape. The polymeric substrate thereby covers the frame and defines a body of the headrest 12 shown as having substantially trapezoidal sides with a rounded top surface. The body tapers in height from the front face 13 reward to the pivot rod 34 described below. Once assembled, the body is further covered with padding 46, especially on the front face 13, and flexible upholstery material on the front face 13 as well as the top and side surfaces. The frame 42 shown in FIG. 5 is only exemplary of various possible frame structures. The frame can be made of metal, plastic materials, or other load carrying materials that provide sufficient strength to support a seat occupant's head during a vehicle collision.

Figure 8:
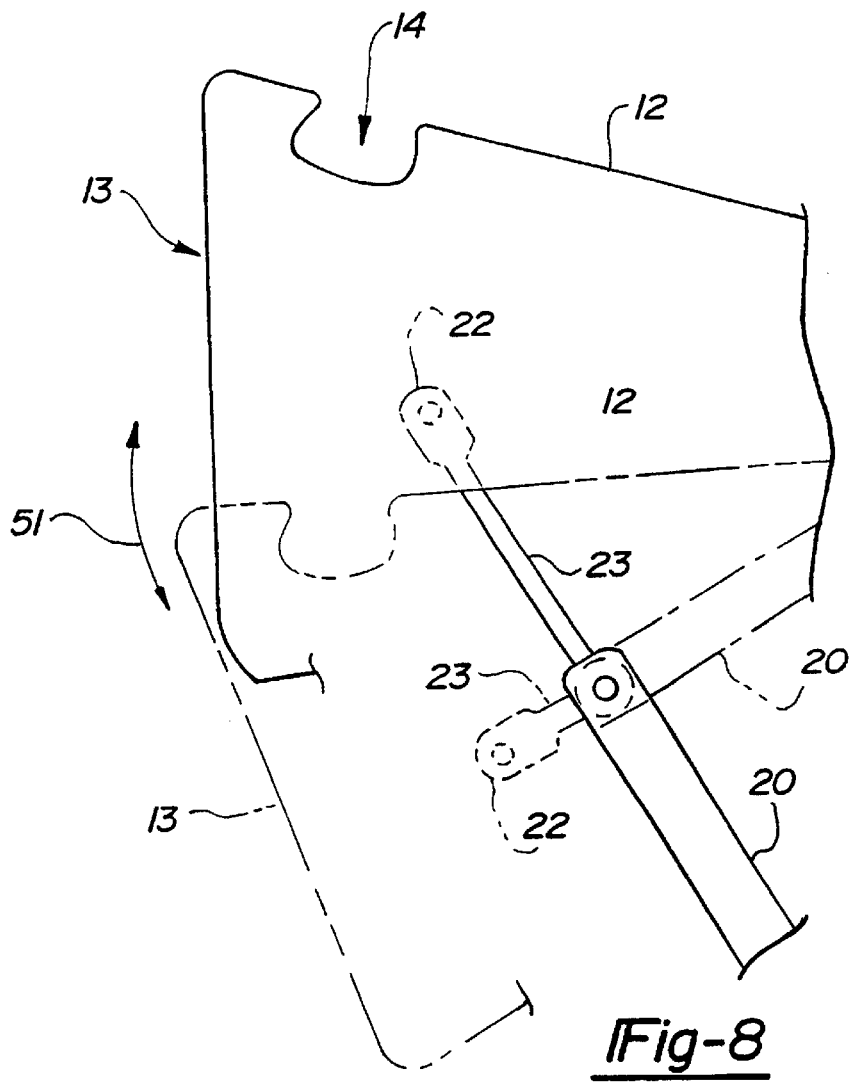
FIG. 8 is a fragmentary, enlarged side view of the pop-up headrest illustrating the over center positioning of a strut with pneumatic cylinder and rod in both the raised and lowered positions.
Figure 9:
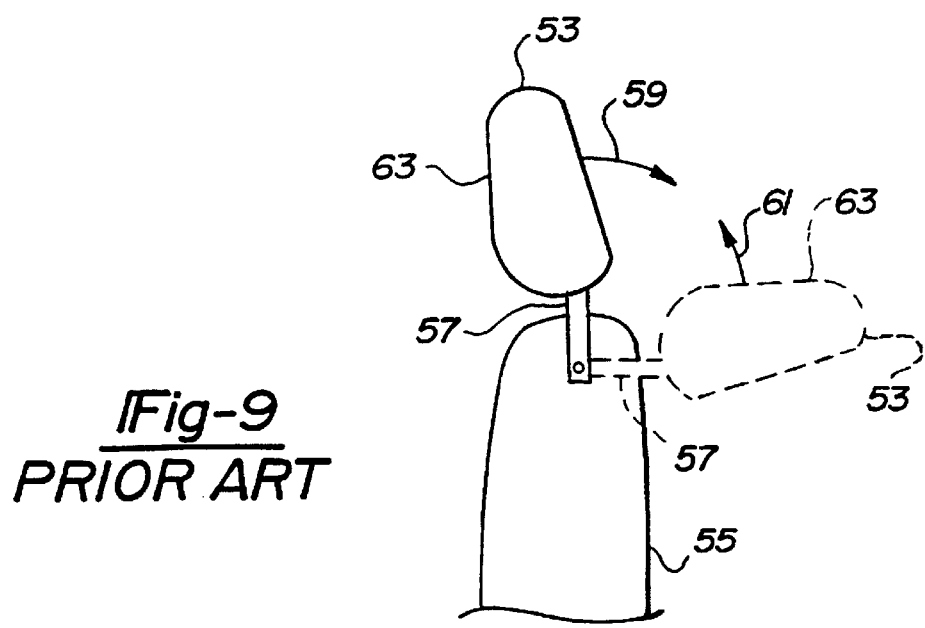
FIG. 9 is a side view illustrating the motion of a prior art headrest.

With reference to FIG. 8, when the headrest is moved from its retracted stowed position to its raised use position, it moves in the direction of the arrow 51. The direction of motion of the headrest is substantially parallel to the front face 13. This direction of rotation is different from many prior art headrests, such as the headrest shown in FIG. 9. There, a headrest 53 is attached to a backrest 55 adjacent the upper end thereof. The headrest mounting posts 57 are rotatably coupled to the backrest 55 for rotation between an upright use position, shown in solid line, to a rearwardly retracted position, shown in the phantom line. The motion of the headrest 53 is shown by the arrows 59 and 61. The direction of this motion is generally perpendicular to the front face 63 of the headrest 53.

Figure 6:
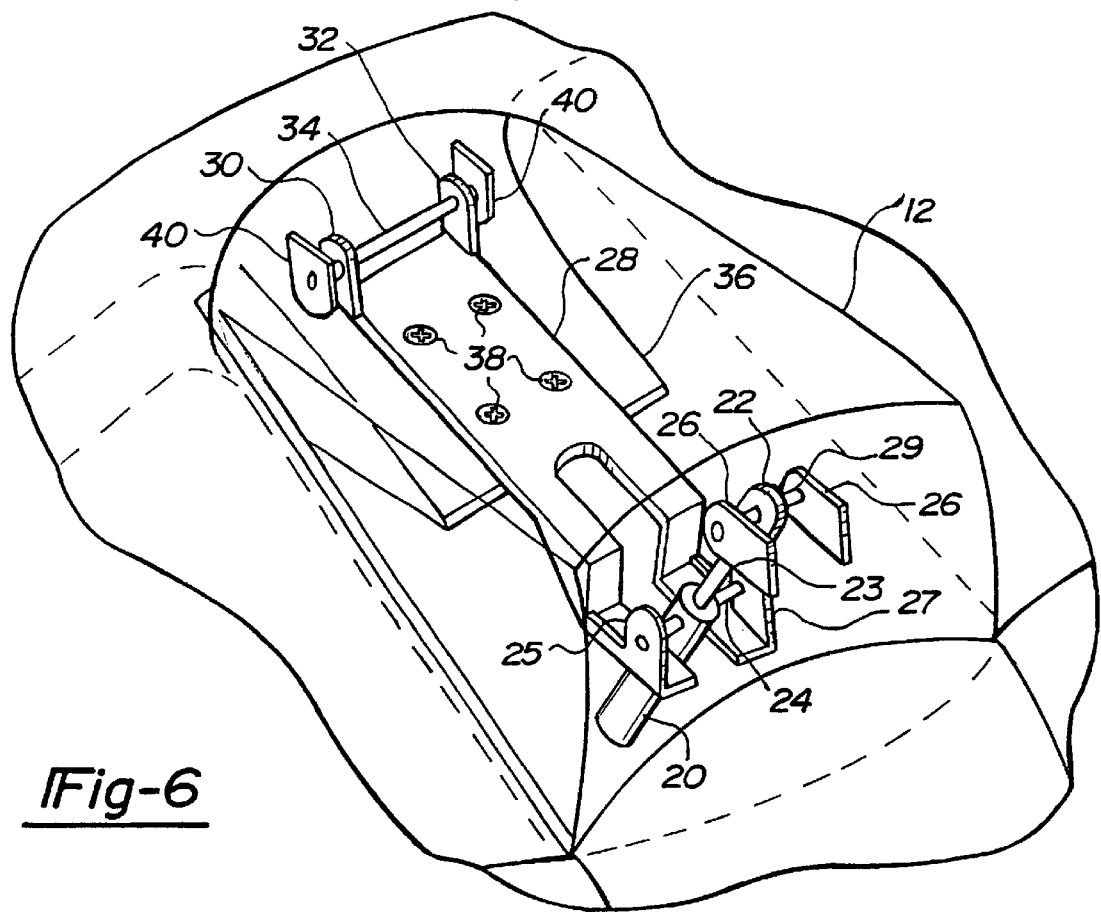
FIG. 6 is a schematic drawing illustrating the assembly of the pop-up headrest shown in its raised, deployed position.

With particular reference to FIG. 6, a support plate 28 is shown fastened to the vehicle body 36 at the package tray 16 of the vehicle by way of screws 38. The support plate 28 includes a pair of parallel flanges 30 and 32 through which a pivot rod 34 extends to provide a pivot axle. A pair of connecting arms 40 are rigidly connected to or formed by the internal frame 42 of the headrest 12. Accordingly, the headrest 12 is pivotable about the pivot rod 34 at the rear of the headrest 12 so as to raise and lower the headrest 12 between its deployed and retracted positions.

An over-center gas strut, having a pneumatic cylinder 20 containing compressed gas, is pivotally connected to flanges 25, 27 at the other end of the support plate 28 by way of a pivot rod 24. The strut has a slide rod 23 axially disposed at least partially within pneumatic cylinder 20 with a distal end 22 connected to the internal frame 42 of the headrest 12 via a rod 29 and connecting arms 26 of the frame 42. Accordingly, the strut with the pneumatic cylinder 20 is connected to the headrest 12 and pivotable about the rod 24 so as to provide an over-center biasing function of the headrest 12. As shown, the pneumatic cylinder 20 forcibly urges the rod 23 and the rod distal end 26 axially away from the body of the cylinder 20. When the headrest 12 is deployed in the raised use position, the pneumatic cylinder 20 forcibly actuates the rod 23 axially outward so as to hold the headrest 12 in its fully raised, operable use position. Full extension of the strut defines the maximum raised position of the headrest. In this raised use position, the strut biases the headrest 12 to its fully raised position by applying an upward vertical force. At the same time, the gas strut via the pneumatic cylinder 20 can provide added energy absorption for the headrest 12.

Figure 7:
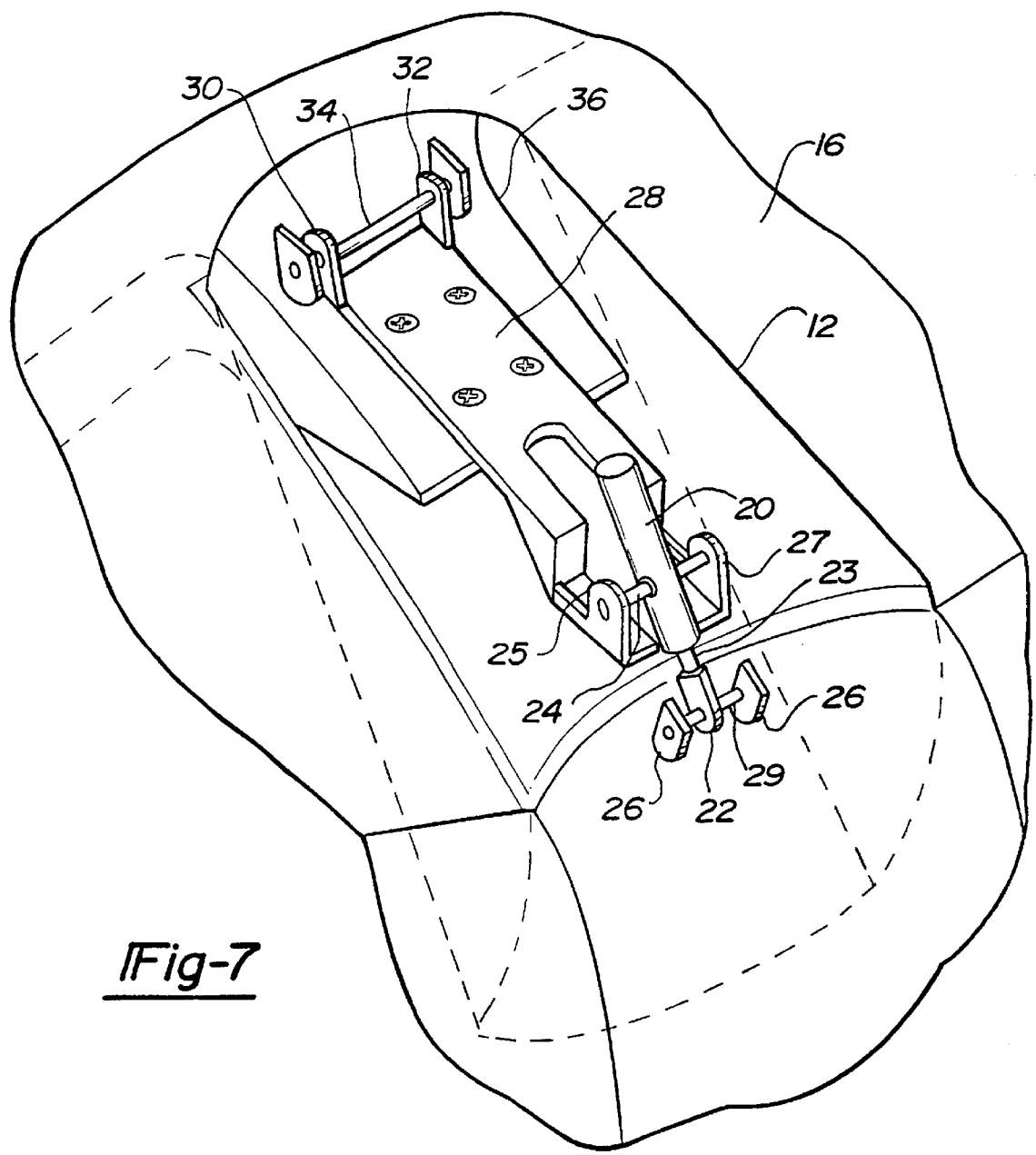
FIG. 7 is a schematic drawing illustrating the pop-up headrest of FIG. 6 shown in its lowered, retracted position.

When the headrest 12 is manually lowered and returned to its retracted stowed position, as shown in FIG. 7, the pneumatic cylinder 20 is forcibly compressed and the strut pivots about the rod 24 beyond the over-center position to thereby urge the headrest 12 in the lowered, stowed position. In effect, when the cylinder 20 is pivoted to its over-center equilibrium position, the rod 23 is compressed to the furthest distance that it is subjected to which, according to the embodiment shown, occurs when the cylinder is horizontal. As the headrest 12 is further lowered to its fully stowed position, in which the lower edge thereof abuts a strip formed in the vehicle body, the strut, including the cylinder 20, rotates beyond its over-center position such that the rod 23 partially extends axially further from the over-center equilibrium position. Accordingly, the over center biasing function causes the strut to apply a vertical downward force to the headrest 12 when the headrest 12 is in the lowered, stowed position, and to apply a vertically upward force to the headrest 12 when the headrest 12 is in the raised use position. The relative positioning of the strut with the pneumatic cylinder 20 as it biases the headrest 12 in both the raised and lowered positions is further illustrated in FIG. 8.

The resultant pop-up headrest 12 provides a head restraint for a passenger seated in the middle section of the back seat of a vehicle when the headrest 12 is in the raised position, and yet allows the headrest 12 to be stowed in a lowered position when not in use. This serves to provide head restraint protection and comfort for the passenger when in use and allows the driver of the vehicle to see clearly out the back window when the headrest is retracted to its stored position.

Other types of over-center mechanisms can be used in place of the gas cylinder 20 and rod 23. For example, a cylinder having a compression spring to urge the rod outward can be used in place of the gas cylinder described above. Alternatively, a spring coupled to the support plate 28 and the headrest frame 42, in the appropriate configuration, can be used to provide over-center biasing without the use of a cylinder and rod.

While the pop-up headrest 12 has been described herein for use in connection with a rear seat of a vehicle, particularly for use as a middle passenger headrest, it should be appreciated that the pop-up headrest of the present invention may be deployed with various seating arrangements, including deployment on either outboard side of the seat, without departing from the spirit of the present invention.

It is to be understood that the invention is not limited to the exact construction illustrated and described above, but the various changes and modifications may be made without departing from the spirit and scope of the invention as defined in the following claims.

We claim:

1. In a vehicle having a seat assembly with a generally upright backrest having a front facing seating surface with an upper end and a vehicle body located behind said backrest at said upper end thereof, a headrest movable between a retracted stowed position substantially below said upper end of said backrest and a raised use position extending generally above said upper end of said backrest, said headrest having a front face forming a head engaging support surface, said front face being generally parallel with and spaced rearward of said seating surface of said backrest when said headrest is in said retracted stowed position, said front face being generally parallel with said seating surface when said headrest is in said raised use position above said upper end of said backrest and said headrest being mounted to said vehicle body at a location spaced rearwardly of said backrest.

2. The headrest as defined in claim 1 further comprising an over-center bias mechanism which, when said headrest is in said raised use position holds said headrest in said raised use position and when said headrest is in said retracted stowed position holds said headrest in said retracted stowed position.

3. The headrest as defined in claim 2 wherein said over-center bias mechanism includes a strut having a cylinder and a rod biased to a position extending from said cylinder.

4. The headrest as defined in claim 3 wherein said cylinder is a gas cylinder.

5. The headrest as defined in claim 1 wherein said headrest, when moving between said retracted stowed position and said raised use position, moves in a direction that is substantially parallel to said front face.

6. The headrest as defined in claim 1 wherein said front face is disposed in a recess in a rear surface of said backrest when said headrest is in said retracted stowed position.

7. A vehicle seat assembly comprising:

a generally upright backrest having a front facing seating surface and an upper end;

a headrest movable between a retracted stowed position substantially below said upper end of said backrest and a raised use position extending generally above said upper end of said backrest; and an over-center bias mechanism which, when said headrest is in said raised use position holds said headrest in said raised use position and when said headrest is in said retracted stowed position holds said headrest in said retracted stowed position.

8. The vehicle seat assembly as defined in claim 7 wherein said over-center bias mechanism includes a strut having a cylinder and a rod biased to a position extending from said cylinder.

9. The vehicles eat assembly as defined in claim 8 wherein said cylinder is a gas cylinder.

10. The vehicle seat assembly as defined in claim 7 wherein said headrest includes a front face forming a head engaging support surface, said front face being generally parallel with said seating surface of said backrest when said headrest is in said raised use position and when said headrest is in a said retracted stowed position.

11. The vehicle seat assembly as defined in claim 10 wherein said backrest has a rear surface behind said seating surface and a forwardly recessed portion in said rear surface into which said front face is disposed when said headrest is in said retracted stowed position.

12. The vehicle seat assembly as defined in claim 10 wherein said headrest rotates about a transverse axis located rearward of said front face when said headrest is moved between said retracted stowed position and said raised use position.

13. The vehicle seat assembly as defined in claim 12 wherein said headrest includes a body which forms said front face and which extends rearwardly to said transverse axis and which tapers in height as said body extends rearward from said front face.

* * * * *